W. H. ELLIOTT.
FILTER FOR FOOT VALVES.
APPLICATION FILED FEB. 28, 1918.
1,264,035.
Patented Apr. 23, 1918.
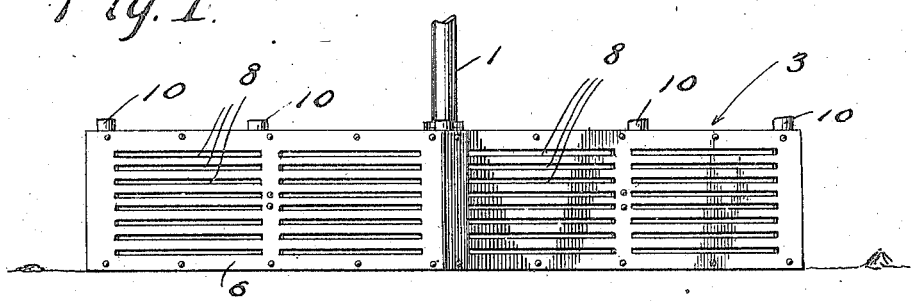
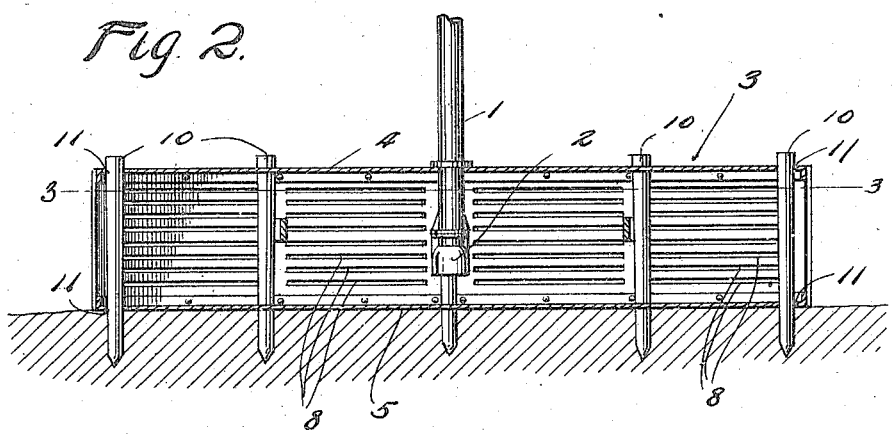
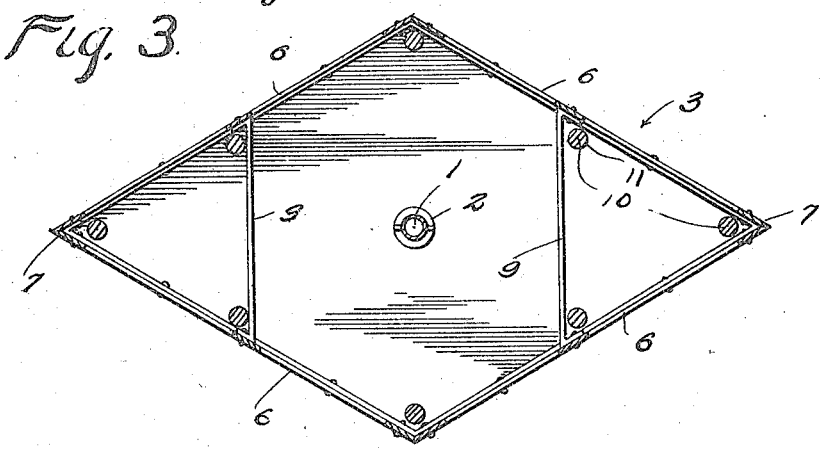
Inventor
William H. Elliott
By R. Morgan Elliott & Co.
Attorney

UNITED STATES PATENT OFFICE.

WILLIAM H. ELLIOTT, OF WASHINGTON, DISTRICT OF COLUMBIA.

FILTER FOR FOOT-VALVES.

1,264,035.  Specification of Letters Patent.  Patented Apr. 23, 1918.

Application filed February 28, 1918. Serial No. 219,640.

*To all whom it may concern:*

Be it known that I, WILLIAM H. ELLIOTT, a citizen of the United States, residing at Washington, in the District of Columbia, have invented certain new and useful Improvements in Filters for Foot-Valves, of which the following is a specification.

This invention relates to straining or filtering devices and has particular reference to a filter or strainer for foot valves.

In supplying water to steam plants located on river or other water fronts, it is usual to suspend a foot or suction valve into the water at the end of a pipe line through which water is pumped from the river or other water source to supply the steam boilers. These foot valves usually require a guard or strainer of some sort, and particularly in those cases where the foot valves are suspended in tide-water it is necessary to provide filtering guards or strainers to prevent floating weeds and river grass from clogging the foot valve and also from being drawn into the pipe line. Those filtering guards or strainers which have heretofore been known to me are as subject to clogging from the grass and weeds, even though kept away from the valves, as are the valves themselves and it is the object of this invention to provide a filtering box or strainer which will at all times maintain a free flow of strained water to the foot valve, regardless of the flow of the tide. Thus, generally speaking, I provide an elongated box, whose sides, in plan view, preferably form a diamond-shaped outline, the acute angular corners of the diamond-shape extending up and down stream, so that a minimum opportunity is provided for river growth to catch onto the box. Furthermore, since all of the sides of the box are provided with passages for the flow of water, the tide or current which tends to deposit grass upon one acute angled corner will tend to free the opposite corner of clogging grasses, so that at all times there will be a proper flow of strained water to the foot valve.

With the above principal object in view, and others relating to the details of construction, and the manner of positioning and securing the strainer or filter box in position, as may hereinafter appear, my invention will now be fully set forth and described reference being had to the accompanying drawings, in which:

Figure 1 is a side elevation of the strainer or filter box.

Fig. 2 is a longitudinal section therethrough, and

Fig. 3 is a section on the line 3—3 of Fig. 2.

Referring more particularly to the drawings, 1 represents the vertical element of a pipe line which is extended out from the shore of a river or other body of water for the purpose of pumping water into the boiler system of a power plant. As is customary, the lower end of the pipe element 1 is provided with a suction or foot valve 2, the valve being shown in a graphic manner in the present case, merely to illustrate its relative position within the filter box 3. The filter or strainer box 3 is formed, essentially, of a closed top 4, a closed bottom 5 and a plurality of sides 6. In the present case the number of these sides is four and they are so joined to the top and bottom that a somewhat elongated diamond-shaped receptacle is formed, with the pipe line element 1 projected through the center of the top plate 4 so that the foot valve 2 is freely suspended within the box. In locating the filter box within the body of water, the acute angled corners 7 are located so that they point in the directions of currents in the body of water. Thus, when located in a river, the apexes 7 are pointed into the direction of the current and as a result meet, not only the ordinary flow of the water in its course down stream, but meet reversals of the current due to the flow of the incoming tide. By thus positioning the acute angled apexes 7, the sides 6 are placed at gentle angles to the flow of the water in either direction, so that grass, weeds and other obstructions are fended off from the foot valve and induced to pass beyond the box.

The side plates 6 are provided with the elongated parallel horizontal slots 8 through which the water is given free access to the body of the box the slots 8 being properly proportioned to prevent the passage of grass and weeds to the interior of the box. At certain seasons of the year, when great quantities of river grass are passing out of the river it is possible that bunches will become matted against the up-stream apex 7, and by being thrown against the sides 6 by the flow of water will clog the slots upon that side of the box. However, this action will not interfere with the proper flow of the water to the foot valve, as the downstream sides will be kept free of the grass, and the foot valve will be properly flooded at all times. Likewise, when the tide changes so that the current is started upstream, if grass then mats against the downstream sides of the box, the upstream flow will free the grass from the upper sides. Thus, it is practically impossible for the box to become clogged in such manner as to prevent the access of water to the foot valve, and at the same time, all grass and weeds are prevented from coming within the reach of the foot valve and of being sucked into the pipe line.

It will probably be found necessary in most cases to provide suitable transverse braces 9 to hold the sides 6 in rigid relation and so that there will be no danger of their being crushed by logs or other flotsam.

Generally the box 3 is placed upon the river bottom, and is held in position by means of piles 10 which are passed through registering apparatus 11 in the top 4 and bottom 5, and then driven into the river bottom, thereby securely anchoring the filter box. On the other hand, if it becomes necessary at any time to remove the filter box, the piles 10 may be readily withdrawn without injuring the box. In some cases it may be found desirable or necessary to use anchors other than wooden piles. Thus, pipe sections may be passed through the openings 11 and driven into the river bottom, and then filled with concrete, this method of anchoring the box providing a more permanent structure.

It will be apparent from the foregoing description that I have provided a very simple but effective structure for insuring a free flow of clean water to a foot valve at all times, so that it will practically never be necessary to shut down a plant which is equipped with my invention, for the purpose of cleaning the foot valve or suction pump. Therefore, aside from its economy of structure, it results in a practical economy of labor and time in the operation of a plant.

What is claimed, is:—

1. A filter box for foot valves, consisting of top and bottom plates, and a plurality of side plates having elongated slots for the passage of water, said side plates being disposed in acute angular relation so that when the box is anchored in a stream, the acute angled apexes lie in the direction of the current.

2. A filter box for foot valves, consisting of top and bottom plates, and a plurality of side plates having elongated slots for the passage of water, said side plates being disposed in acute angular relation so that when the box is anchored in a stream, one acute apex points up-stream and another acute apex points down-stream.

3. A filter box for foot valves, consisting of top and bottom plates, and a plurality of side plates arranged in a diamond-shape, so as to have two acute-angled apexes, which may lie up-stream and down-stream respectively to present said side plates at slight inclines to the current, said plates having elongated slots for the access of water to the box.

In testimony whereof I affix my signature.

WILLIAM H. ELLIOTT.

Copies of this patent may be obtained for five cents each, by addressing the "Commissioner of Patents, Washington, D. C."